United States Patent Office 2,785,143
Patented Mar. 12, 1957

2,785,143

RUBBER REINFORCED WITH A BUTADIENE 1,3-METHYL METHACRYLATE COPOLYMER

Peter George Edgerley, Stevenage, England, assignor to Imperial Chemical Industries Limited, London, England, a corporation of Great Britain No Drawing. Application May 3, 1954,
Serial No. 427,391

Claims priority, application Great Britain May 11, 1953

6 Claims. (Cl. 260—5)

This invention relates to thermoplastic compositions comprising natural or synthetic rubber and a resinous copolymer of methyl methacrylate and butadiene derived from a mixture of monomers in which the methyl methacrylate is present in major proportion, and to vulcanised rubbery materials produced from said compositions.

For many applications it is necessary to add large amounts of carbon black to natural or synthetic rubbers in order to improve their physical properties for particular purposes. However, the use of carbon black as a reinforcing agent for natural or synthetic rubber has certain disadvantages, e. g. it gives the vulcanised rubber a black coloration which in itself may be undesirable and which may cause marking on floors when such rubbers are used for shoe soles. We have now found that the physical properties of vulcanised natural or synthetic rubbers for particular purposes, particularly where leather-like materials are desired, e. g. in shoe soles, are improved without using significant amounts of carbon black, by blending the unvulcanised natural or synthetic rubber with a resinous copolymer obtained by copolymerizing a mixture of butadiene 1,3 and methyl methacrylate containing 75 to 95% by weight of methyl methacrylate.

According to the present invention we provide a composition comprising natural and/or synthetic rubber and a resinous copolymer, the resinous copolymer having been obtained by polymerising a mixture of butadiene 1,3 and methyl methacrylate containing 75 to 95% by weight of methyl methacrylate based on the weight of the mixture. The resinous copolymer may be obtained by polymerising a mixture containing a small proportion, e. g. up to 5% by weight of the monomer mixture of a third compound copolymerisable with butadiene 1,3 and methyl methacrylate e. g. styrene, provided the properties of the resinous copolymer so obtained are substantially the same as those of the resinous copolymer derived from butadiene 1,3 and methyl methacrylate alone.

The synthetic rubbers which may form part of the compositions of our invention may be any known synthetic rubber, e. g. polybutadiene and copolymers of butadiene 1,3 which are derived from mixtures of butadiene 1,3 and a copolymerisable compound, the butadiene 1,3 forming the major constituent of the mixture, e. g. 75% by weight of the monomer mixture. Compounds which are copolymerisable with butadiene 1,3 to form synthetic rubbers are for example, styrene, acrylonitrile and methyl methacrylate. Many of these synthetic rubbers are commercially available.

The compositions of our invention have their greatest value when the resinous copolymer is mixed with natural rubber because the reinforcing effect is considerably greater with natural rubber than with synthetic rubber. However, to obtain the maximum possible reinforcement of synthetic rubber we prefer to mix therewith a resinous copolymer derived from a mixture of butadiene 1,3 and methyl methacrylate containing from 83 to 87% by weight of methyl methacrylate based on the weight of the monomer mixture.

The amount of resinous copolymer which should be mixed with the natural and/or synthetic rubber will depend upon the use to which the vulcanised composition is to be put since, in general, as the proportion of resinous copolymer is increased, the flexibility of the final cured rubber is reduced. For natural rubber compositions suitable for the manufacture of shoe soles, we prefer that there should be from 30 to 50 parts by weight of resinous copolymer to 100 parts by weight of natural rubber, since such compositions when vulcanised in many mays resemble leather but have much better wearing properties than leather, and are easily processed on shoe making equipment designed for processing leather. In other applications more or less copolymer may be required according to the application, and compositions containing from 5 to 95% by weight of copolymer based on the weight of copolymer plus rubber may be used in a variety of applications as hereinafter described.

Our compositions may be prepared by mixing the resinous copolymer and the rubber by means of a masticating mixer, e. g. rolls or a Banbury type mixer or by mixing the resinous copolymer in latex form with a rubber latex and thereafter coagulating or spray drying the mixed latices. Generally spray drying is possible only when the amount of added rubber is small, e. g. up to about 10% by weight of the solid composition. Where the compounding of the vulcanisable composition is to be carried out by means of a masticating mixer, we prefer to use the resinous copolymer in the form of a composition containing preferably a minor proportion of rubber, since such compositions are easily processed with natural or synthetic rubber. Such a composition is conveniently obtained by blending the resinous copolymer latex with the rubber latex and isolating the composition by coagulating the mixed latices or by spray drying when the amount of added rubber is small, e. g. up to about 10% by weight of the composition. In order that the greatest scope should be given for further compounding this composition, we prefer that the amount of rubber with which the resinous copolymer is blended should be the least amount which will give a composition which is compatible with natural or synthetic rubber. We accordingly prefer that in preparing such compositions the amount of resinous copolymer should preferably form from 50% to 95% by weight of the composition.

The resinous copolymer is preferably prepared by polymerising the mixture of monomers when dispersed in an aqueous phase containing an emulsifying agent. The polymerisation process is preferably carried out in the presence of a polymerisation catalyst, for example a water soluble oxygen yielding catalyst or a reduction activation system generally known as a redox catalyst and comprising a mixture of an oxidising agent and a reduction activating agent capable of reacting with the oxidising agent. Examples of water soluble oxygen yielding catalysts include hydrogen peroxide and the alkali metal persulphates, e. g. potassium persulphate. An example of a redox catalyst is cumene hydroperoxide, or benzoyl peroxide, together with a ferrous sulphate-potassium pyrophosphate complex, and sorbose or fructose. The amount of catalyst used depends upon the particular catalyst used, and also to some extent upon the degree of agitation used in mixing the emulsion during the reaction. For example, with potassium persulphate about 0.02 to 0.20% is the amount normally required based on the weight of the monomer mixture.

The temperature at which the copolymerisation reaction is carried out depends upon the type of catalyst which is used. With water soluble oxygen yielding catalysts the reaction is preferably carried out at temperatures from 30° C. to 60° C. since at temperatures below 30° C. the reaction tends to be too slow whilst at temperatures above 60° C. the reaction may be difficult to control. Redox catalysts are generally more active and it is often necessary to carry out the reaction at lower temperatures, e. g. down to about 5° C.; if the polymerisation reaction is carried out at temperatures below 0° C. it is necessary to add to the polymerisation mixture a compound which prevents freezing but which does not affect the polymerisation rate, e. g. methanol.

The emulsion polymerisation process is also preferably carried out in the presence of a polymerisation modifier dissolved in the monomer mixture.

The use of polymerisation modifiers is well known in the manufacture of butadiene copolymers and their use is preferred because they assist in the production of copolymers having good reinforcing properties. Polymerisation modifiers are mostly sulphur containing compounds, e. g. aliphatic mercaptans and organic polysulphides, e. g. dialkyl xanthogen disulphides, di(benzoic acid ester) tetra sulphides, tolyldisulphide and tolyltrisulphide. The preferred compounds are primary, secondary or tertiary aliphatic mercaptans containing not less than six carbon atoms and not more than 18 carbon atoms because the copolymers obtained by the use of these mercaptans have the best reinforcing properties. Mercaptans containing less than 6 carbon atoms tend to diffuse too rapidly to the surface of the monomer droplets during the polymerisation process and to be used up rapidly, whilst mercaptans having more than 18 carbon atoms are less easily soluble in the monomer than the preferred mercaptans. We have found that the best results are obtained when mercaptans containing 12 carbon atoms are used, e. g. tertiary dodecyl mercaptan and also normal dodecyl mercaptan containing small amounts of higher mercaptans. The use of the preferred $C_6$ to $C_{18}$ mercaptans has the added advantage that when used in the presence of a water soluble oxygen yielding catalyst they serve to assist in promoting the copolymerisation process. The amount of mercaptan modifier used is normally from about 0.05% to about 1% by weight of the monomer mixture, preferably from 0.1 to 0.4%. In general increasing the amount of modifier increases the softness of the copolymer and its solubility in organic solvents.

Any of the usual emulsifying agents may be used, e. g. alkali metal salts of sulphonated or sulphate long-chain hydrocarbons and vegetable fats and oils, water soluble salts of sulphuric acid esters of fatty alcohols, i. e. alcohols corresponding to fatty acids of animal and vegetable fats, oils and soaps. Examples of specific emulsifying agents include sodium lauryl sulphate, sodium oleyl sulphate, sodium cetyl sulphate, the sodium salt of sulphonated castor oil, the sodium salt of sulphonated or sulphated methyl oleate, sodium oleate, sodium palmitate and sodium stearate. We prefer not to use the corresponding ammonium salts since in many cases they cause the reaction rate to be reduced. The amount of emulsifying agent normally used is from 3% to 6% based on the weight of the monomer mixture. If desired, the amount of emulsifying agent used may be reduced by the addition of known dispersing agents, e. g. cetyl alcohol ethylene oxide condensates and sodium $\beta$ naphthalene sulphonate/formaldehyde condensates. The amount of dispersing agent required to assist in forming a stable latex is not more than about 0.3% by weight based on the weight of the monomer mixture, and in general the use of about 0.1% of dispersing agent based on the weight of the monomer mixtures enables the amount of emulsifying agent to be reduced by about one third.

At the completion of the copolymerisation process the solid copolymer may be isolated by first coagulating the latex and then filtering and drying the copolymer, or by spray drying the latex. The latex may be coagulated by the addition of known coagulants, e. g. acetic acid, dilute mineral acids, and the soluble salts of calcium, magnesium, barium, strontium, aluminium, lead, iron or zinc. Latices may also be coagulated by violent agitation accompanied by a lowering of the temperature. It will be appreciated that the particular coagulant used will depend upon the emulsifying system used, e. g. when an anionic emulsifying agent is used the coagulant is normally acidic, and when the emulsifying agent is cationic the coagulant is normally basic. Certain compounds, e. g. calcium chloride and aluminium sulphate, will coagulate both anionic and cationic emulsions. In preparing our compositions by mixing the resinous copolymer latex with a natural or synthetic rubber latex, the two latices are first intimately mixed in the appropriate proportions and then coagulated as hereinbefore described, or spray dried.

Other ingredients, e. g. pigments, fillers, plasticisers, softeners, antioxidants and vulcanising agents and accelerators may be added to the composition either by addition to the latices or by compounding on rolls or in a masticating mixer.

Our compositions may be vulcanised to give cured materials by known methods, e. g. by moulding under a pressure of about 1 ton/square inch at 150° to 160° C. for about 30 minutes. It will be appreciated that the precise vulcanising conditions will depend upon the composition which is being vulcanised and the final product which it is desired to obtain.

Our compositions may be used in a variety of applications, e. g. the vulcanised composition may be used in view of its better wearing properties to replace leather as shoe soling material and in articles such as suit cases, trunks and the like. Other applications include rubbery compositions having improved extrusion characteristics and rubber flooring.

Our invention is illusrtated, but not limited, by the following examples in which all parts are expressed by weight.

*Example 1*

200 parts of water containing 0.18 part of potassium persulphate and 6 parts of sodium lauryl sulphate were poured into a stirred autoclave. 85 parts of methyl methacrylate containing 0.10 part n-dodecyl mercaptan were then poured in and the autoclave was sealed down. The autoclave was then purged three times with nitrogen, and 15 parts of butadiene 1,3 were blown in.

The autoclave was maintained at 50° C. for 10 hours at the end of which time a latex was obtained containing 96.1 parts of resinous copolymer. The latex was spray dried and the resinous copolymer obtained in the form of a fine dry powder.

The following recipe was then compounded on a two roll low friction mill the rolls of which were heated to 70–80° C.:

| | Parts |
|---|---|
| Resinous copolymer | 40 |
| Natural rubber | 100 |
| Activated calcium silicate | 100 |
| Coumarone indene resin of melting point 125° C. | 7 |
| Zinc oxide | 5 |
| Dibenzthiazyl disulphide | 2 |
| Tetramethylthiuram disulphide | 0.15 |
| Sulphur | 3 |
| Phenyl $\beta$ naphthylamine | 1 |
| Stearic acid | 1 |
| Paraffin wax | 1.5 |
| Pigment | 5 |

After compounding, the composition was cured for 30 minutes at 153° C. under a pressure of about 1 ton/square inch. The cured rubber thus obtained had a tension strength of 1275 lbs./square inch, a tear resistance of 560 lbs./square inch and a B. S. hardness of 93°.

Example II 80 parts of methyl methacrylate were copolymerised with 20 parts of butadiene 1,3 by the method described in Example I to give a latex containing approximately 33% of resinous copolymer by weight of the latex. The latex was spray dried and the resinous copolymer obtained in the form of a fine dry powder.

The following recipe was then compounded on a two roll low friction mill, the rolls of which were heated to 70–80° C.:

| | Parts |
|---|---|
| Resinous copolymer | 40 |
| Pale crepe | 80 |
| GR–S type rubber (derived from 23 parts by weight styrene and 77 parts by weight butadiene 1,3) | 20 |
| Activated calcium silicate | 100 |
| Coumarone indene resin of melting point 125° C | 7 |
| Zinc oxide | 5 |
| Dibenzthiazyl disulphide | 2 |
| Tetramethylthiuram disulphide | 0.15 |
| Sulphur | 3 |
| Phenyl β naphthylamine | 1 |
| Stearic acid | 1 |
| Paraffin wax | 1.5 |
| Pigment | 5 |

After compounding, the composition was cured for 20 minutes at 153° C. under a pressure of about 1 ton/square inch. The cured material thus obtained had a tension strength of 1295 lbs./square inch, an elongation at break of 320%, a modulus at 100% elongation of 715 lbs./square inch, a hardness of 91° B. S. and a specified gravity of 1.28. The material also had good flex cracking properties.

Example III

The resinous copolymer obtained in Example II was compounded with natural rubber according to the following recipe:

| | Parts |
|---|---|
| Resinous copolymer | 40 |
| Pale crepe | 100 |
| Activated calcium silicate | 100 |
| Coumarone indene resin of melting point 125° C | 7 |
| Zinc oxide | 5 |
| Cyclohexyl benzthiazyl sulphenamide | 1.1 |
| Diphenyl guanidine | 0.35 |
| Sulphur | 3 |
| Phenyl β naphthylamine | 1 |
| Stearic acid | 1 |
| Paraffin wax | 1.5 |
| Pigment | 5 |

After compounding, the composition was cured for 20 minutes at 153° C. under a pressure of about 1 ton/square inch. The cured material thus obtained had a tension strength of 1550 lbs./square inch, an elongation at break of 375%, a modulus at 100% elongation of 650 lbs./square inch, a hardness of 89.5° B. S. and a specific gravity of 1.27.

I claim:

1. A composition comprising natural rubber and a resinous copolymer, the resinous copolymer having been prepared by polymerising a mixture of butadiene 1,3 and methyl methacrylate containing from 75 to 95% by weight of methyl methacrylate based on the weight of the mixture.

2. A composition according to claim 1 comprising from 5% to 95% by weight of resinous copolymer based on the weight of resinous copolymer and natural rubber.

3. A composition according to claim 2 comprising from 30 to 50 parts by weight of resinous copolymer to 100 parts by weight of natural rubber.

4. A composition according to claim 2 comprising from 50% to 95% by weight of resinous copolymer based on the weight of resinous copolymer and natural rubber.

5. A method of preparing a composition according to claim 1 in which a separately prepared dispersion of said resinous copolymer is intimately mixed with a natural rubber latex and the mixture is thereafter coagulated.

6. A method of preparing a composition according to claim 1 in which a separately prepared dispersion of said resinous copolymer is intimately mixed with a natural rubber latex in such proportions that the solid natural rubber content is not more than 10% by weight based on the total weight of solid resinous copolymer plus solid natural rubber, and the mixture is thereafter spray dried.

References Cited in the file of this patent

UNITED STATES PATENTS

| 2,232,515 | Arnold et al. | Feb. 18, 1941 |
| 2,442,588 | D'Alelio | June 1, 1948 |
| 2,614,093 | Wheelock | Oct. 14, 1952 |